J. W. BRYCE.
TIME INDICATING SYSTEM.
APPLICATION FILED SEPT. 7, 1917.
1,298,000.
Patented Mar. 25, 1919.
9 SHEETS—SHEET 1.
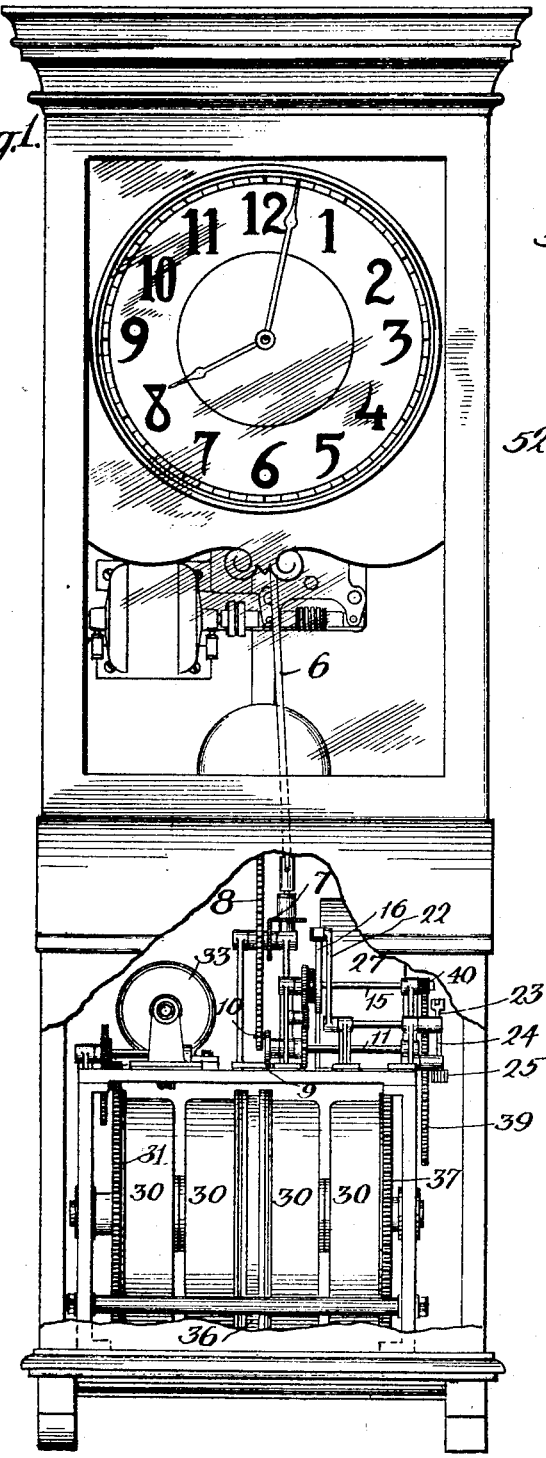
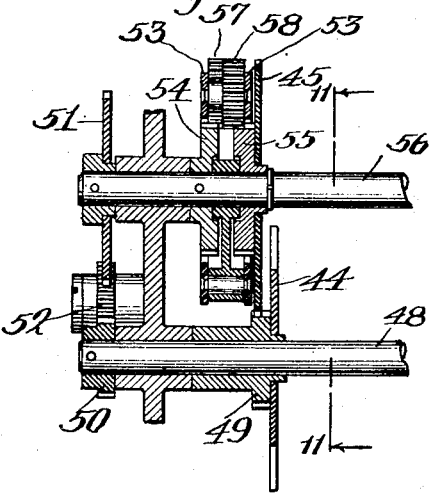
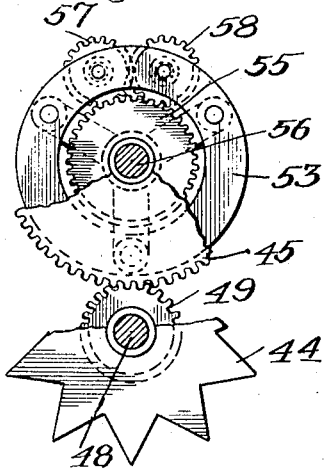
INVENTOR
James W. Bryce
BY
Kerr, Page, Cooper & Hayward
ATTORNEYS

J. W. BRYCE.
TIME INDICATING SYSTEM.
APPLICATION FILED SEPT. 7, 1917.

1,298,000.

Patented Mar. 25, 1919.
9 SHEETS—SHEET 2.

INVENTOR
James W. Bryce
BY
Kerr, Page, Cooper & Hayward
ATTORNEYS

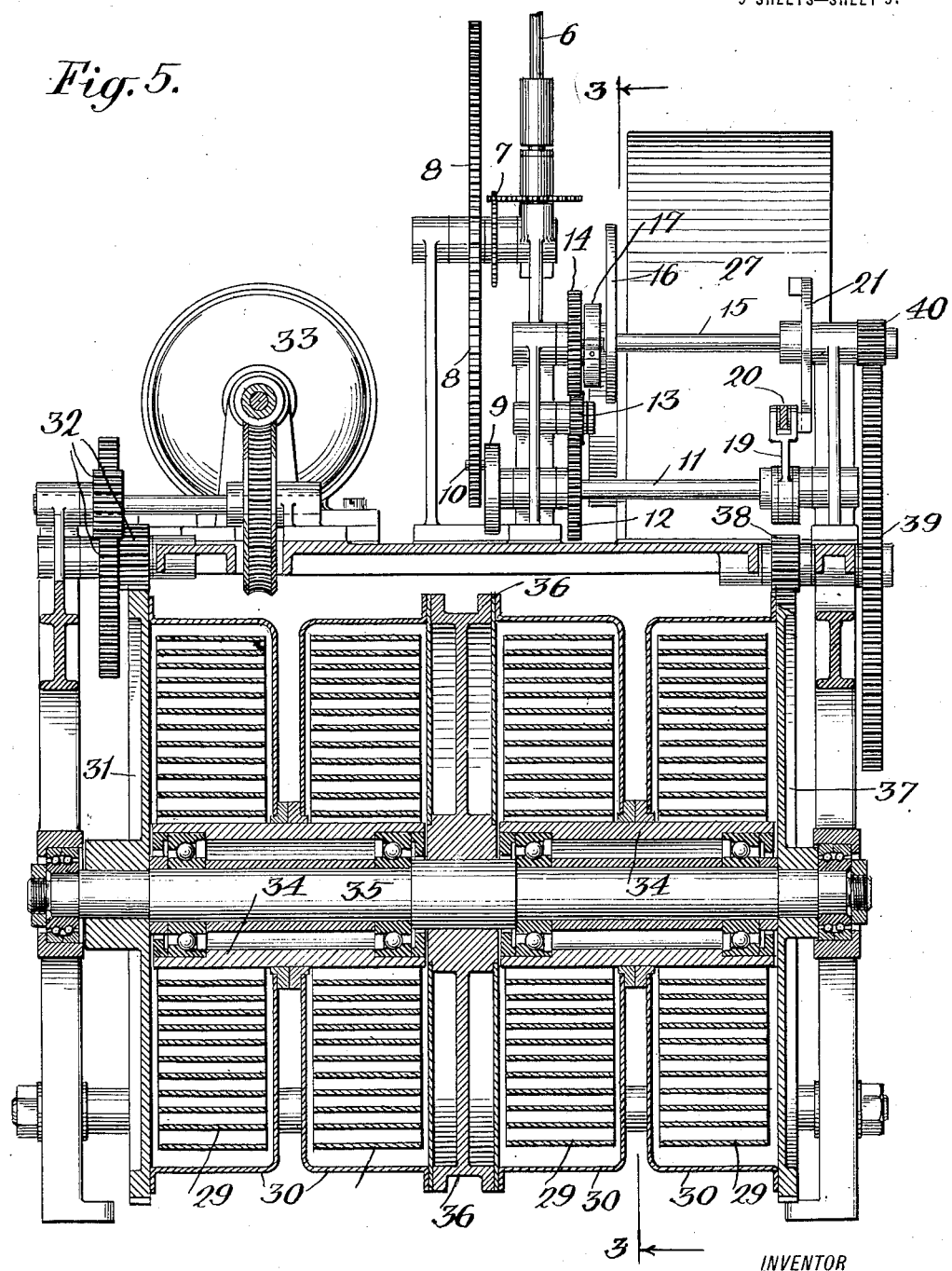

J. W. BRYCE.
TIME INDICATING SYSTEM.
APPLICATION FILED SEPT. 7, 1917.
1,298,000.
Patented Mar. 25, 1919.
9 SHEETS—SHEET 6.
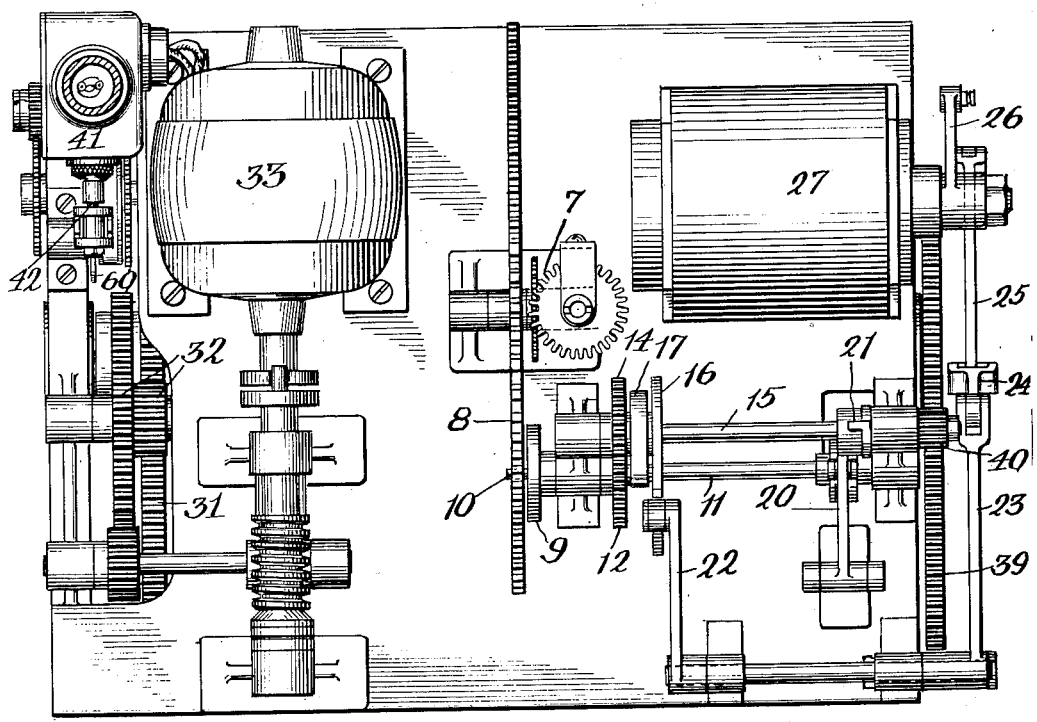
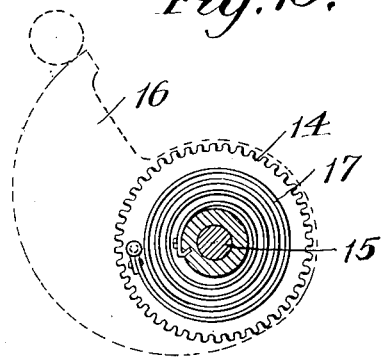
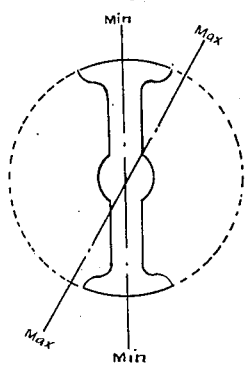
INVENTOR
James W. Bryce
BY
Kerr, Page, Cooper & Hayward
ATTORNEYS

J. W. BRYCE.
TIME INDICATING SYSTEM.
APPLICATION FILED SEPT. 7, 1917.

1,298,000.

Patented Mar. 25, 1919.
9 SHEETS—SHEET 7.

INVENTOR
James W. Bryce
BY
Kerr, Page, Cooper & Hayward.
ATTORNEYS

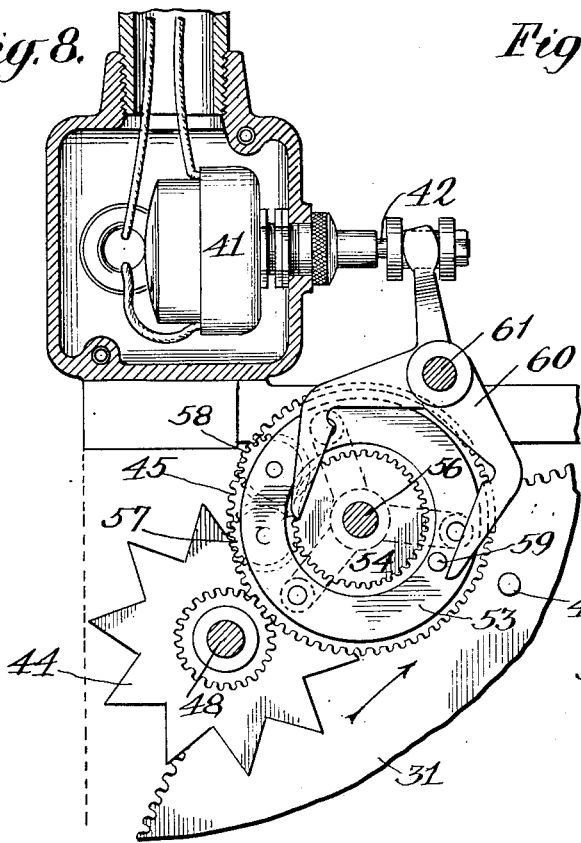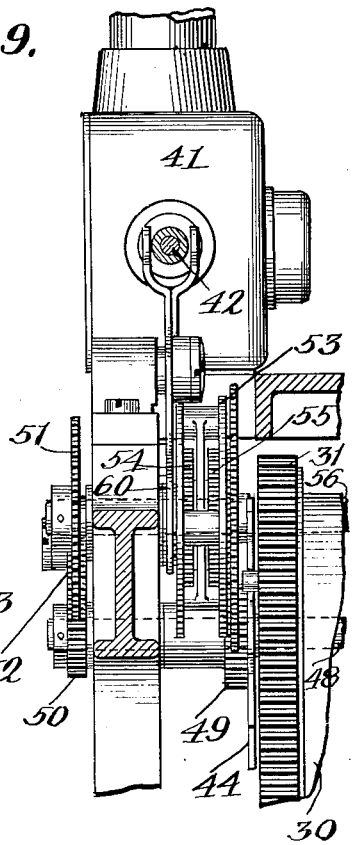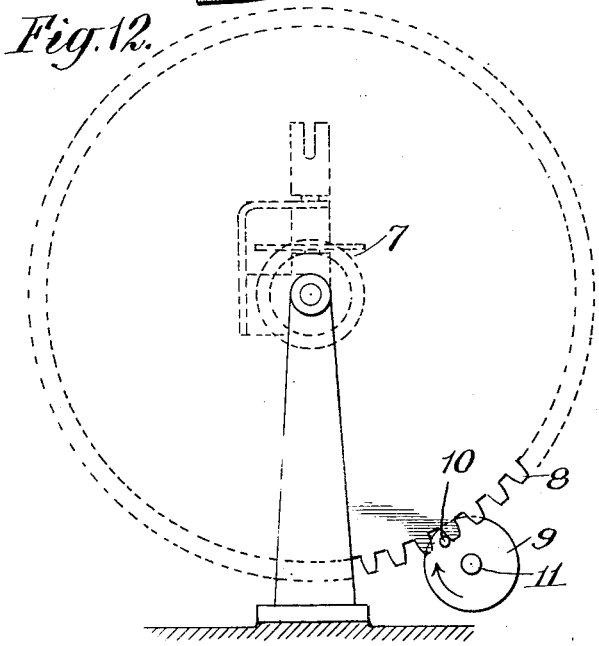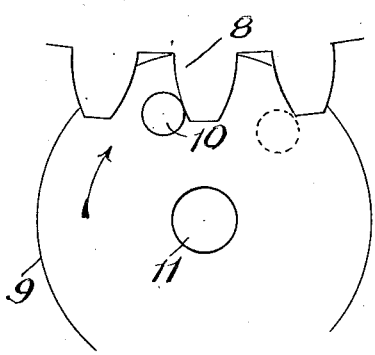

J. W. BRYCE.
TIME INDICATING SYSTEM.
APPLICATION FILED SEPT. 7, 1917.

1,298,000.

Patented Mar. 25, 1919.
9 SHEETS—SHEET 9.

INVENTOR
James W. Bryce
BY
Kerr, Page, Cooper & Hayward
ATTORNEYS

UNITED STATES PATENT OFFICE.

JAMES W. BRYCE, OF BLOOMFIELD, NEW JERSEY.

TIME-INDICATING SYSTEM.

1,298,000.  Specification of Letters Patent.  Patented Mar. 25, 1919.

Application filed September 7, 1917. Serial No. 190,120.

*To all whom it may concern:*

Be it known that I, JAMES W. BRYCE, a citizen of the United States, residing at Bloomfield, in the county of Essex and State of New Jersey, have invented certain new and useful Improvements in Time-Indicating Systems, of which the following is a full, clear, and exact description.

In certain industrial systems, such as those involving the use of time recording instruments, it is essential to have a master clock that periodically moves the time disks of the recording instruments in order that their operations may at the same time exhibit a record of the exact time of such operation. Usually this is effected by the controlled energy of a source of electric current which may be derived from a municipal lighting or power circuit, or from some local source, such as a primary or storage battery that presumably, is always in condition to furnish the desired current.

Experience has demonstrated in a most emphatic manner that such sources of current constitute the most objectionable features in connection with such systems. The original expense of the apparatus rendered necessary, the failure of unskilled or incompetent employees to properly maintain, particularly the storage batteries, and the objections of fire underwriters to the use of heavy currents without the most perfect system of fire preventive protection, all contribute to the reasons which are found against their adoption and use.

A master clock may be wound by hand, but it is infinitely preferable that it shall be self winding under the action of an electric current. Such a clock may control the time recorders in many ways. It may cause the development of magneto instead of effecting the control of battery currents, but unless there is present and at all times available a proper source of electric energy for winding the clocks and furnishing the power necessary for the operation of the system, only a fractional part of the precautions to insure uninterrupted operation are present. A breakdown on a municipal lighting or power circuit for example, or a temporary suspension in the local production of current might occur just at the time when power was needed or the clock required rewinding to keep it from running down and disarranging the whole system.

The object of the invention which constitutes the subject of this application is to provide a system free from the objections indicated above. To accomplish this I use for the control of the recording mechanism or whatever other devices may be used in their stead, magneto current impulses, generated in a magneto machine which is directly under the control of a master clock, under such conditions that it is operated at given and regular intervals to send out current impulses of sufficient force to operate the recording instrument disks or their equivalents.

The indicating or recording devices are wound when necessary by any source of current or desirably, by current locally developed during the operation of the plant or establishment in which the system is installed, during the working hours or days in which the plant is in operation, but to provide for interruptions in such operation, as over Sundays or holidays, or even for two or more consecutive days of inaction which may occur, I utilize the current, when or while available, to wind up at lesser intervals than are required for its running down, what I term a storage spring and that is capable of operating the magneto under the control of the clock for periods safely in excess of any ordinary period of interruption in operation, so that under all ordinary conditions the system will be maintained in operation irrespective of the availability of a source of operating current.

Aside from the principle underlying the invention, the novelty resides in the general plan of the means employed in carrying it out. A detailed description is therefore necessary for a more complete understanding of the advance which I have made in the art. I have therefore illustrated my improved mechanism in all its details, and shall now refer to the drawings for a description of the same.

Figure 1 is a face view of my improved apparatus with the casing of the lower portion broken away to exhibit the interior mechanism.

Fig. 5 is a central vertical section of the apparatus.

Fig. 6 is a plan view of the escapement device.

Figs. 8 and 9 are enlarged detail views of a switch controlling mechanism.

Fig. 10 is a central sectional view of a differential controlling mechanism and its driving gears.

Fig. 11 is a vertical sectional view on the line 11—11 of Fig. 10 with certain portions broken away.

Fig. 12 is a detailed view of the clock escapement control.

Fig. 13 is a diagram of the teeth of the clock escapement control wheel and the pin that coacts with it.

Fig. 15 is a detailed view of the spring connection between the control cam and the driving gear therefor.

Fig. 16 is a diagram of the magneto armature illustrating the angle through which it rotates in developing a current wave from minimum to maximum.

Figure 17:
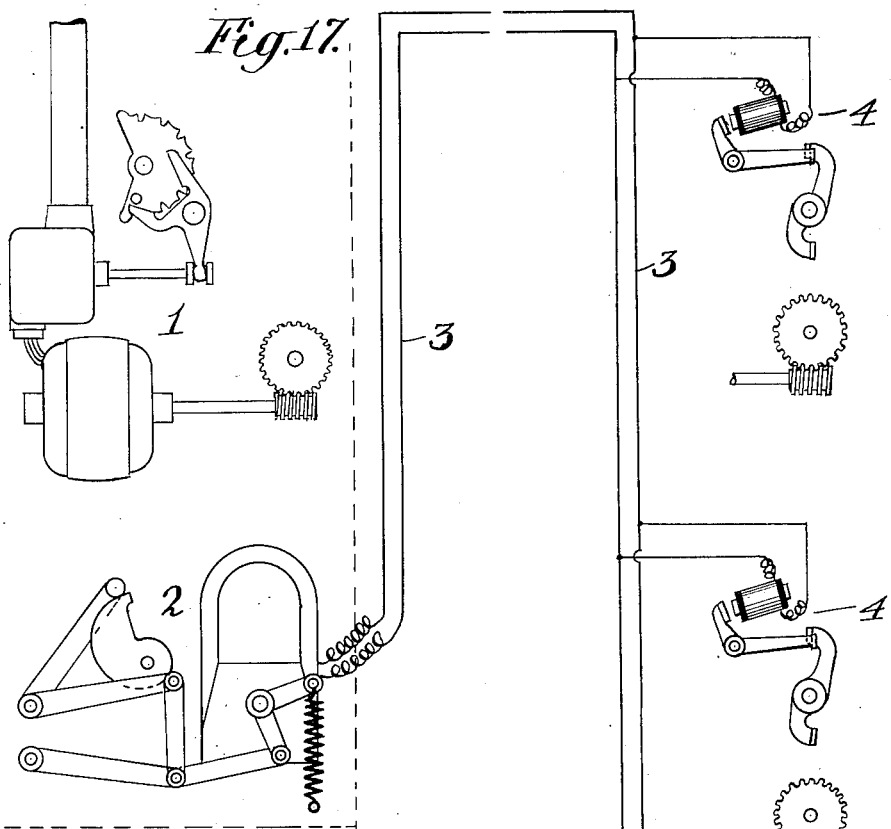
Fig. 17 is a diagram showing an electrically wound clock with its magneto escapement device and apparatus controlled by it.

The general nature of the problem involved is illustrated in Fig. 17, in which 1 designates any known form of what may be considered an electrically wound master clock; 2 a magneto escapement device operated or controlled thereby; and 3 a circuit including any number of time recording mechanisms or other like devices 5. The master clock is assumed to operate the magneto at stated intervals of, say, one minute, to send impulse to line and by their effect therein to impart single revolutions to disks or wheels, or movements of given extent to any other devices that may require them for their proper operations.

The clock and its winding means and control mechanism it is not necessary to describe, as these are known in the art. By the clock mechanism, however, is rotated a spindle 6, which by means of gears 7 imparts rotation to a toothed wheel 8, said wheel having sixty teeth and making one complete revolution in exactly one hour.

A disk 9, having a single pin 10, is mounted on a shaft 11 in fixed bearings which carries a gear wheel 12, meshing with a pinion 13, which in turn engages a gear wheel 14, loosely mounted on a shaft 15. The pin of this disk engages the teeth of the gear wheel 8, and is advanced by the movement of said gear to a point where it may rotate under a proper impelling force if such be applied to it. For this purpose there is mounted on the shaft 15, a coiled spring 17, see Fig. 15, one end of which is connected to the gear wheel 14, and the other to the hub of a cam 16, mounted fixedly on the shaft 15, and which therefore tends to impart rotation to the disk 9 through the gears 12, 13 and 14.

On the shaft 11 is an eccentric 18 that reciprocates an arm 19, as the said shaft revolves, and this arm is pivoted to a swinging stop lever 20, the end of which normally lies in the path of a rotary escapement arm 21, having ends of unequal length. When the arm 19 is raised it releases the longer end of the escapement arm 21, so that the latter under an impelling force of a power spring, to be hereinafter described, starts in rotation. By the time it has made one half revolution, the shorter arm engages with the stop lever 20, which is in its most elevated position, and which on the lowering of said lever allows the arm to complete its revolution.

Figure 2:
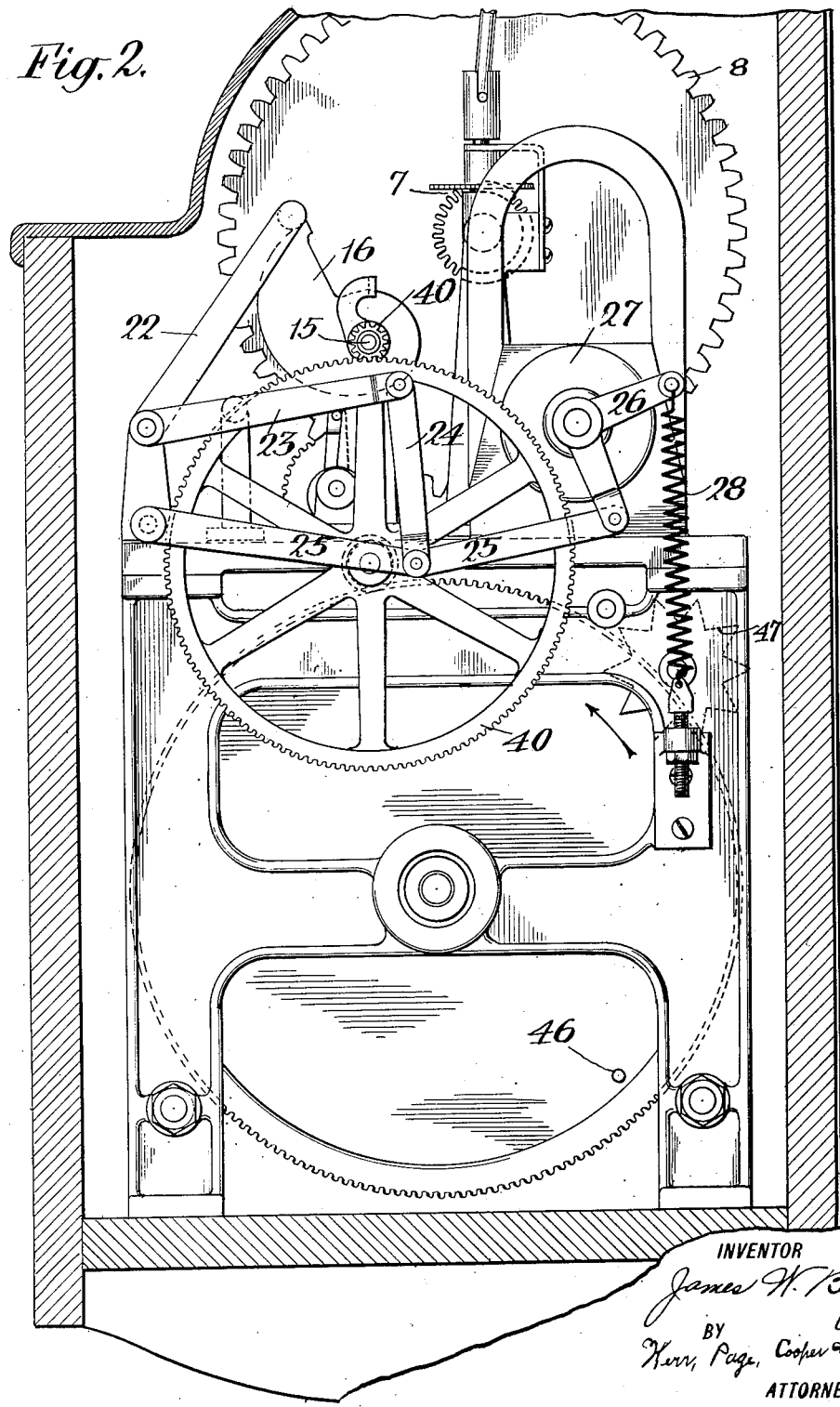
Fig. 2 is an end view of an escapement device employed in the device and shown in the previous figure.
Figure 3:
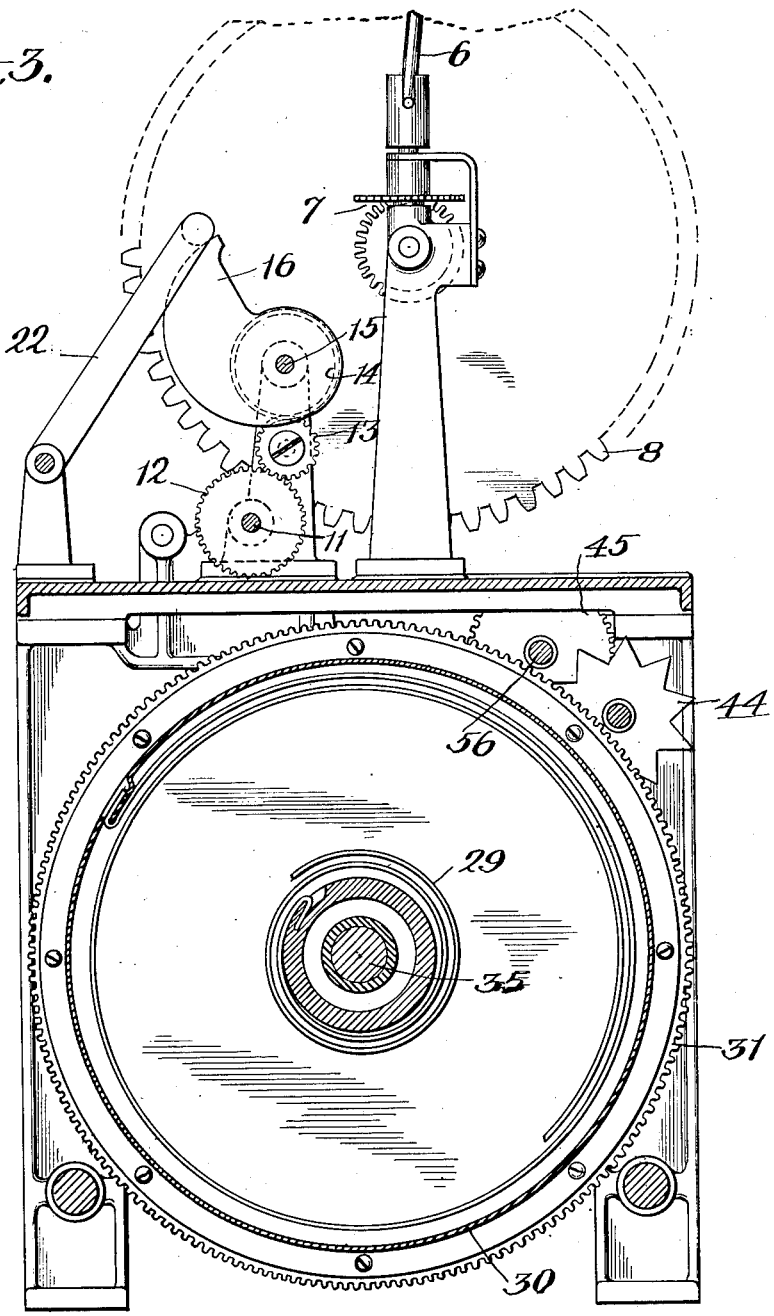
Fig. 3 is a sectional view of the apparatus on the line 3—3 of Fig. 5, looking from the right.
Figure 4:
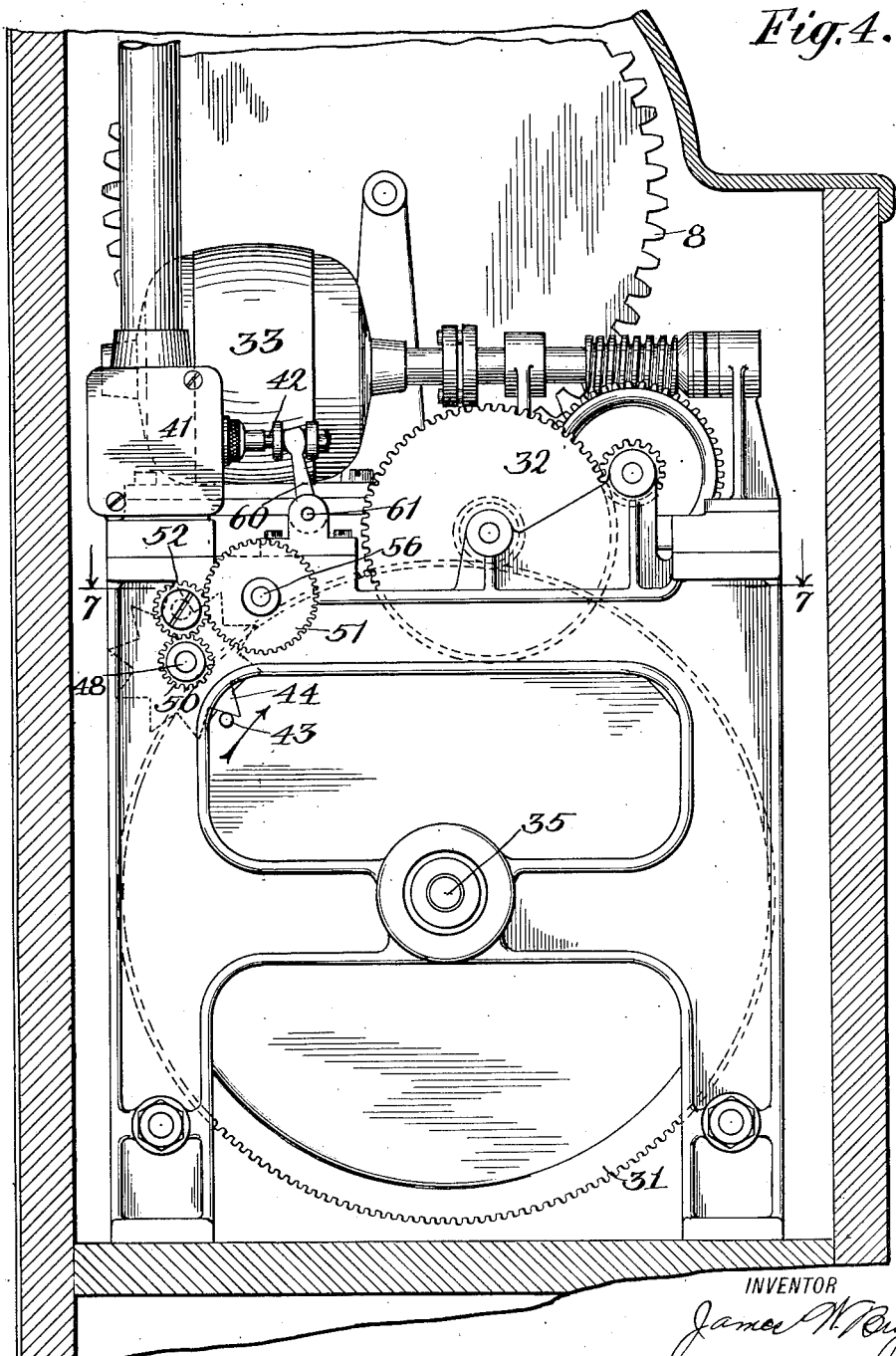
Fig. 4 is an end view similar to Fig. 2, but looking from the left.

The cam 16 controls the operation of a swinging lever 22, rigid with an arm 23 that is connected by a link 24 with a toggle 25, one member of which is pivoted to a fixed support and the other to a bell crank lever 26, on the armature shaft of a magneto generator 27, these parts being shown to best advantage in Fig. 2. A spring of suitable power 28 is connected to the end of the free arm of bell crank lever 26, and to a fixed support and tends to pull that arm downward.

The toggle is normally in an inoperative position, being held up by the lever 22, but as the cam 16 is moved counter clockwise by the operation consequent on the release of the disk 9, the lever 22 slips over the end of the cam and falls, thus breaking the toggle and permitting the spring 28 to impart a rapid movement through a determined arc to the armature of the magneto. This generates an impulse of current which goes to the line 3 and operates or effects the operation of whatever instruments may be connected therewith. The extent of armature movement is shown in Fig. 16.

The parts described, after each operation, should be returned to their normal positions, the toggle restored to lock the armature of the magneto, and the parts made ready for the next operation. This should also be done by a relatively slow movement which will not result in the production of a current of such strength as to again operate the line instruments.

The cam 16 is turned by the rotation of shaft 15 under the influence of the storage power spring until its high portion again encounters the lever 22, but by the rotation of the shaft 15 through one revolution controlled by the escapement arm 22, the spring 17 is rewound as much as it can ever unwind, so that whenever the pin 10 of the disk 9 is released from a tooth of the gear wheel 8, the spring has been sufficiently wound to cause the shaft 11, and the eccentric 18 to operate. Manifestly the restoring movement imparted to the toggle will be so slow that no appreciable current is produced in the armature by the motion thereby imparted to it.

Figure 7:
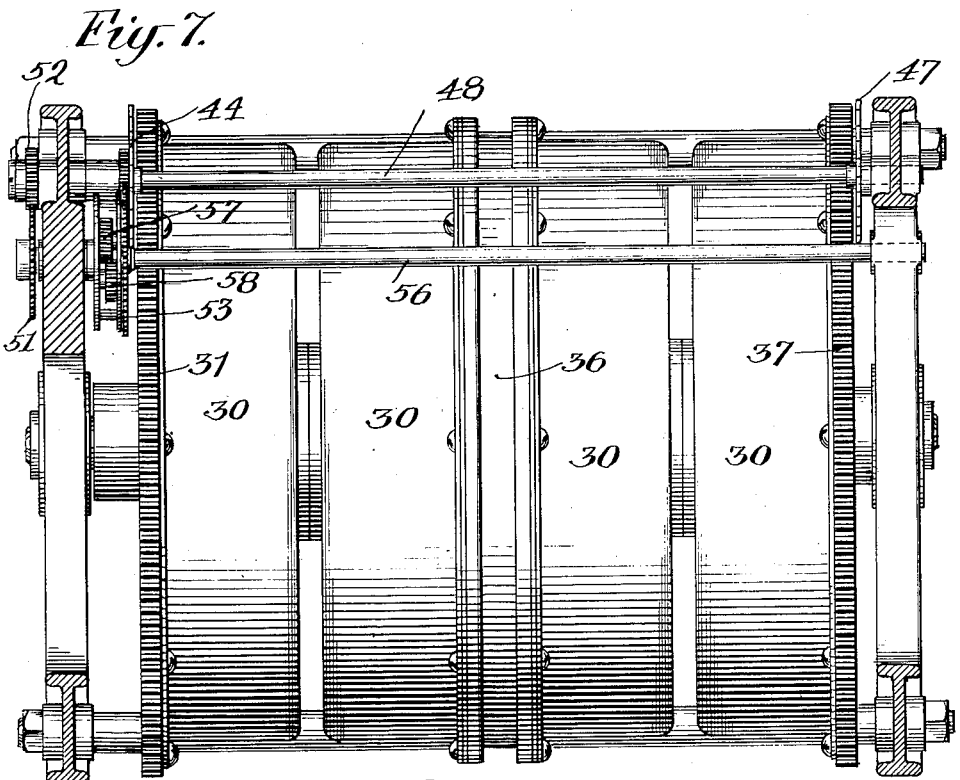
Fig. 7 is a horizontal section on line 7—7 of Fig. 4, looking down.
Figure 14:
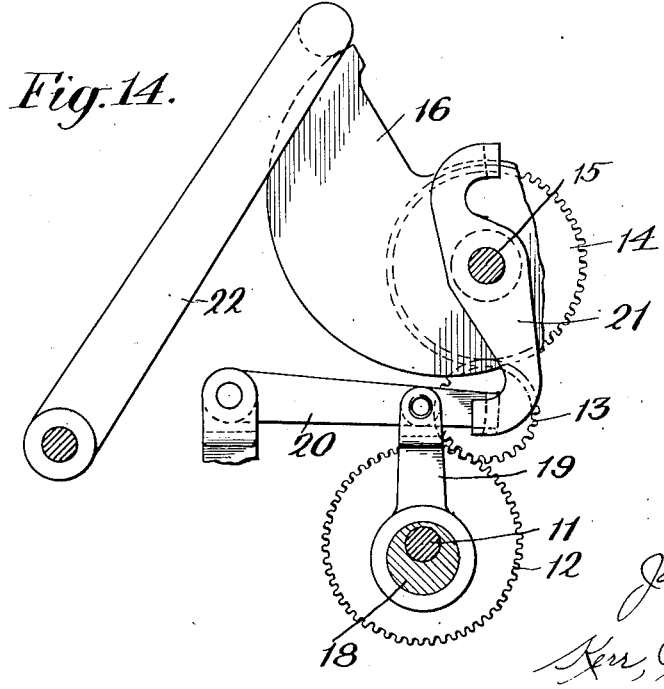
Fig. 14 is a detailed view of the escapement and controlling cam associated therewith.
Figure 18:
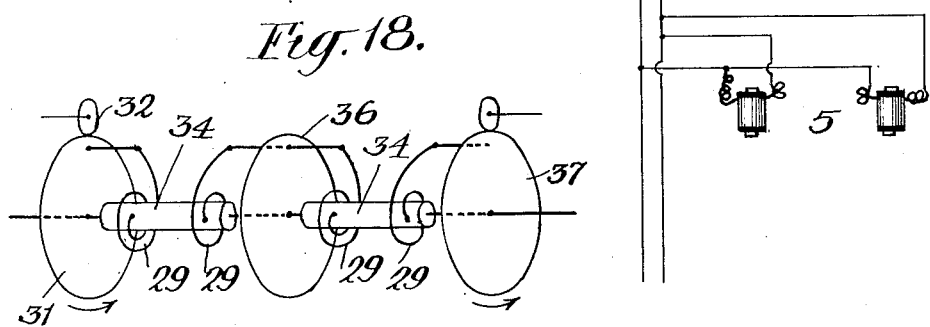
Fig. 18 is a diagram illustrating the relations and functions of the power storage springs used in the instrument.

To supply the power necessarily expended in each operation above described I employ what I term a storage power spring, see Figs. 5 and 7. In reality this is a series of springs in tandem so that a final movement of relatively great extent may be secured by its use. These springs indicated by 29 are placed side by side in suitable casings 30, and are arranged as shown in Fig. 18, that is to say the first spring of the series has one end connected to a gear wheel 31, which is moved by gearing 32, driven by a motor 33, through a worm connection. The other end of this spring is connected with a rotary sleeve 34, shown as having ball bearings between it and the shaft 35.

One end of the second spring is connected also to this sleeve, the other end being made fast to a disk 36, loose on the shaft 35, to which one end of the third spring is connected and so on. It results from this that the final, or unwinding gear 37, will be turned the aggregate number of times which each spring acting independently would effect, although the force with which the said gear is driven is no greater than that of one spring.

The gear 37 meshes with a pinion 38, mounted integrally on a shaft with a gear wheel 39 that in turn meshes with a pinion 40 on the shaft 15. By this means the power of the springs 29 is imparted to shaft 15 and turns the latter one revolution per minute as the same may be released by the disk 9.

The motor 33 is supplied with current from any convenient source, such as a local electric or municipal plant, which may be counted on to furnish energy at least during the periods of running or operation of the plant. Its circuit is controlled by any suitable form of switch, 41 Fig. 8, which is operated by a plunger contact or pin 42, which if drawn outward closes the motor circuit or if forced in breaks it.

The control of the motor is one of the functions of the springs 29, which operate, on the one hand, to break the motor circuit when they are sufficiently wound up, and on the other hand to close the motor circuit when they have run down to a predetermined, but not full extent. To accomplish this I use in conjunction with the winding and the unwindig devices a differential gearing which is illustrated in Figs. 7 to 11.

On the winding gear 31 is a pin 43 which engages with the teeth of a star wheel 44 fixed to a pinion 49 loose on shaft 48 which pinion engages a gear wheel on one side of the differential. By each revolution of the gear 31 therefore the star wheel will be advanced one tooth, and as the said gear in winding turns in the direction of the arrow in Fig. 8 the gear wheel 45 will be rotated clockwise by the star wheel pinion.

The gear wheel 37 at the opposite or unwinding end of the springs carries a pin similar to pin 43, which encounters on each revolution of the wheel one tooth of a star wheel 47, and moves the latter through the space of such tooth. This star wheel 47 is on a shaft 48 that runs back over the springs to the differential where it carries a pinion 50 that imparts rotation to a gear wheel 51, through an idler 52, which gear 51 is fixed to the shaft of the differential.

The differential is of the usual construction and consists of two annular plates 53, secured together, and forming what is known as the cage. Within the cage are two gears 54 and 55, the former fixed to the shaft 56, the latter fixed to the gear 45, and loose on the said shaft. Mounted between the two plates 53, and in gear with each other and with the gears 54 and 55 are two pinions 57 and 58.

It follows from the construction above described that when the gear wheel 31 is turned in winding up the springs, the cage of the differential comprising the two plates 53 is turned in a clockwise direction, but as the gear 37 revolves step by step, the cage is turned very slowly in a counter-clockwise direction by reason of the idler 52 interposed between the pinion 50 and the gear wheel 51.

These movements are availed of to control the circuit of the motor and the operation of the circuit controller 41. A pin 59 is set in one of the plates 53 and operates to shift the position of a forked arm 60, pivoted at 61 and engaging with the plunger 42 of the controller.

The parts shown in Fig. 8 are in the positions they occupy at the moment when the springs have been fully wound. At this point the pin 59 has engaged the right hand arm of the lever 60 and shifted that lever to a point where it has forced in the plunger and broken the motor circuit.

The springs then operate to turn the shaft 15 and perform the functions incident to such operation as has been set forth above and the gear wheel 37 is thus slowly and step by step rotated with the result that after a long lapse of time, the pin 59 on the cage of the differential is turned backward or counter clockwise until it finally meets and shifts the left hand arm of lever 60 and closes the motor circuit whereby the springs are again wound up.

The parts described may be so designed and adjusted that the springs 29, when wound will operate before running down for any desired length of time. Let it be assumed, for example, that a manufacturing plant in which the system is installed is subject to a possible period of inaction from noon on Saturday to Tuesday morning after Labor Day. During this period it is most desirable not only that the master clock, but all of the other time mechanisms should be kept in continuous operation, because the current for the operation of the system may be derived from a local power plant which is shut down completely during the period of inaction. It is manifest that if a power storage device such as I have herein described be employed, and never allowed to run down completely, but to always have enough power in reserve to cover the longest possible period of inaction, that the shutting off or failure of the operating current will have have no effect.

In large measure the invention is independent of the specific devices used in carrying it into effect. The system as I have shown it, however, presents many advantages, not the least of which is that there are no contacts employed, and practically no heavy currents that may not be conveyed over ordinary wires with little or no insulation and no precautions against overload.

It is believed that the above description is sufficiently explicit to fully define the nature and purpose of the invention, but at the risk of repetition the following statement may be added.

Assuming a manufacturing establishment to be equipped with a system involving a plurality of workman's time recorders, the time indicating type wheels of which are periodically moved by a master clock which is adapted to run for a period of eight days and which may be automatically or manually wound whenever necessary. Let it also be assumed that there is to ensue a shut down of two or three days during which no operating current for the power necessary for operating the devices is developed in the plant or is sure to be furnished from other sources. Notwithstanding this the storage springs whether near their rewinding point or not have sufficient stored energy to operate the system for three or four days and not only the master clock but all of the controlled devices will be maintained in operation over the shut down period, and no disarrangement of the system will result. Should the rewinding time be passed during this period, the circuit controller will be closed, so that as soon as the plant starts up and the local power plant set in operation the motor will receive current to rewind the springs.

Having now described my invention what I claim is:—

1. A system of the kind described, comprising, in combination, a master clock, a circuit therefrom, time indicating devices connected with said circuit, spring motors for driving said indicating devices, controlled in their application of power for operating the same by impulses transmitted from the master clock, local sources of current and means controlled by movements of predetermined extent of said motors, less than those required for exhausting them for rewinding the motors by the local current, whereby the system will remain in operative condition over extended periods during which no current from the local source is furnished.

2. A system of the kind described, comprising, in combination, a master clock, a circuit therefrom, a plurality of time indicating devices connected therewith, spring motors for driving the indicating devices controlled in their application of power for operating the same by impulses transmitted from the master clock, electromagnetic motors for winding the spring motor, local sources of current for operating said electric motors, circuit controllers and means operated by a movement of predetermined extent of the spring motors less than required in exhausting them for directing the current of the local sources through the electric motors, whereby the system will remain in operative condition over extended periods during which no local current is furnished.

3. In a system of the kind described, the combination of a master clock, a circuit therefrom, a plurality of time-indicating devices connected with said circuit, a storage power motor, a magneto generator for producing impulses that control the operation of the time-indicating devices, an escapement controlled by the clock for the power motor and an actuating spring therefor adapted to be maintained under operative tension by the said motor.

4. In a system of the kind described, the combination of a master clock, a circuit therefrom and a plurality of time-indicating devices connected with said circuit, a storage power motor, a magneto generator, a lever and a cam driven by the clock, in such operative relation that at predetermined intervals the lever is freed and allowed to move for a given distance, a spring connected with the lever, and connections between said lever and the armature of the generator, whereby when the lever is released by the cam a controlling impulse is sent to line.

In testimony whereof I hereunto affix my signature.

JAMES W. BRYCE.